OBJECTS PROVIDED WITH PROTECTIVE COVERINGS

Original Filed Sept. 29, 1961 3 Sheets-Sheet 1

INVENTORS
JOHN A. PERRI
JACOB RISEMAN

BY Wolmar J. Stoffel
ATTORNEY

OBJECTS PROVIDED WITH PROTECTIVE COVERINGS

Original Filed Sept. 29, 1961 3 Sheets-Sheet 2

United States Patent Office 3,415,680

Patented Dec. 10, 1968

3,415,680

OBJECTS PROVIDED WITH PROTECTIVE COVERINGS

John A. Perri and Jacob Riseman, Poughkeepsie, N.Y., assignors to International Business Machines Corporation, New York, N.Y., a corporation of New York

Original application Sept. 29, 1961, Ser. No. 141,669, now Patent No. 3,247,428. Divided and this application Dec. 20, 1965, Ser. No. 553,583

9 Claims. (Cl. 117—212)

ABSTRACT OF THE DISCLOSURE

The specification discloses a semiconductor having a protective glass coating over a metal oxide first coating.

This is a division of application Ser. No. 141,669, and now Patent No. 3,247,428, filed Sept. 29, 1961.

The present invention is directed to coated objects, such as semiconductor bodies having PN junctions therein which extend to the surface thereof, and to the methods of providing protective coverings for those junctions. More particularly, the invention relates to the method of providing thin impervious glass films for electrical devices such as semiconductor diodes and transistors for the protection of their electrical characteristics. Accordingly, the invention will be described in that environment.

Semiconductor devices for use in various applications such as in computers are made to exacting specifications to assure desired electrical characteristics and to provide precise performance. To retain these electrical characteristics, it is necessary to protect the surfaces of those devices from conditions which would impair their characteristics or otherwise damage or destroy the devices. Moisture and other noxious materials are recognized as agents which are detrimental to the proper operation of semiconductor devices. For several years intensive efforts have been expended with germanium and silicon devices, especially the latter, to combat the effects of those agents by physically or chemically passivating the exposed surfaces of the devices. These efforts have included the formation of oxides on the surfaces of the devices or oxides in conjunction with surface treatments to effect an esterification of silanol groups on the device surfaces. Also, physical treatments of the devices have involved encapsulating them in various plastics or in combinations of oxides and plastics. Other encapsulating media have included low-melting point glasses such as those found in the arsenic-sulphur system and have also included the high lead-silicate glasses.

While the various techniques mentioned above have been moderately successful for some applications, they have not proved to be as effective as may be desired for many purposes. The encapsulation procedures have not afforded adequate junction protection in some instances and have resulted in protective jackets which are entirely too bulky for microminiaturization applications which are presently receiving wide attention in efforts to reduce the size and cost of electrical components and their associated circuits.

It is an object of the invention, therefore, to provide a new and improved method of applying a protective covering to a semiconductor device having a PN junction therein.

It is another object of the invention to provide a new and improved method of applying a protective impervious glass coating to an object.

It is a further object of the invention to provide a new and improved semiconductor member having a protective coating for its PN junctions.

It is also an object of the present invention to provide a new and improved method of applying a thin protective glass film to a semiconductor device, which method is particularly suited to microminiaturization applications.

It is yet another object of the invention to provide a new and improved method of applying a thin glass protective film to a semiconductor device in a manner which will not impair the electrical characteristics of that device.

In accordance with a particular form of the invention, the method of providing a protective covering for a PN junction having a portion extending to a surface of a semiconductor member comprises establishing over that surface and the aforesaid extending portion of the junction an adherent metal oxide film having a thickness in the range of 1,000 to 30,000 angstroms, and chemically bonding to that film a glass coating which has a thickness in the range of 8,000 to 500,000 angstroms. The semiconductor member is one which is capable of withstanding during the bonding a temperature of at least as great as the softening temperature of the coating.

Also in accordance with the invention, a semiconductor member comprises a semiconductor body having a PN junction therein, at least a portion of which extends to a surface of the body. The member also includes a film of metal oxide having a thickness in the range of 1,000 to 30,000 angstroms adherent to that surface and covering the extended portion of the junction, and a glass coating chemically bonded to the aforesaid film having a thickness in the range of 8,000 to 500,000 angstroms. The semiconductor member is capable of withstanding during the bonding operation a temperature corresponding to at least the softening temperature of the coating.

Further in accordance with the invention, a coated object comprises a base member, a film of metal oxide having a thickness in the range of 1,000 to 30,000 angstroms adherent to a surface of that member, and a glass coating chemically bonded to the aforesaid film and having a thickness in the range of 8,000 to 500,000 angstroms, the base member being capable of withstanding during the bonding operation a temperature of at least as great as the softening temperature of the coating.

Figure 1:
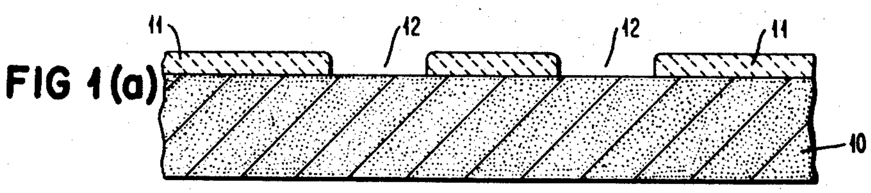
Figure 1:
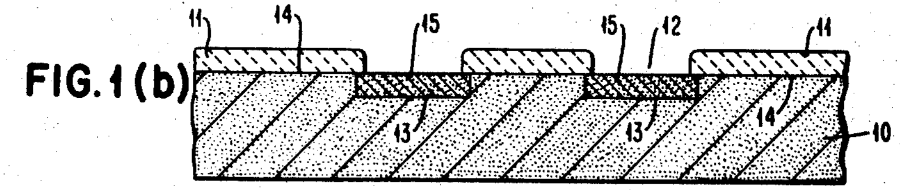
Figure 1:
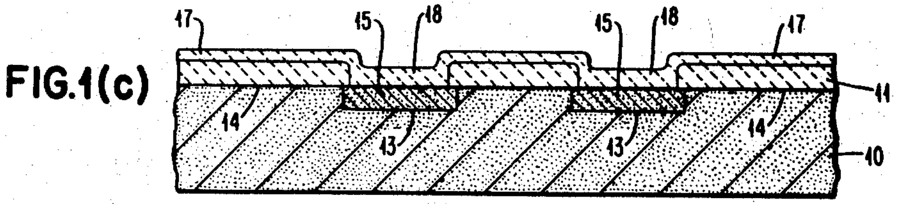
Figure 1:
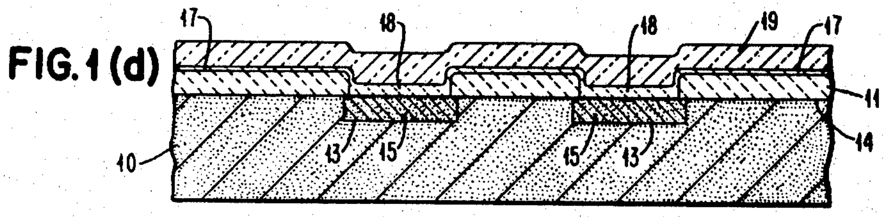
Figure 1:
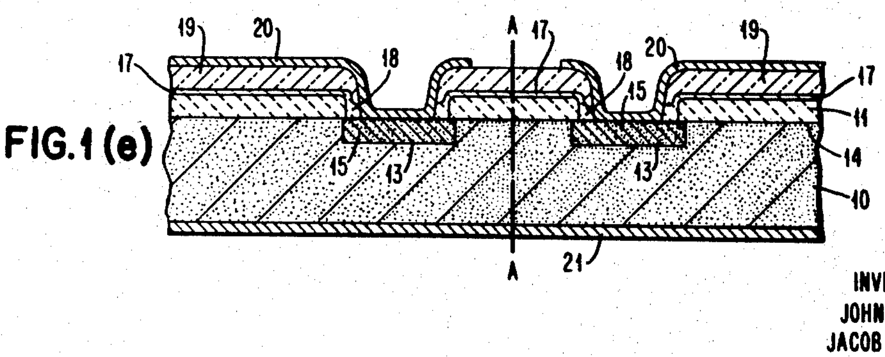
Figure 2A:
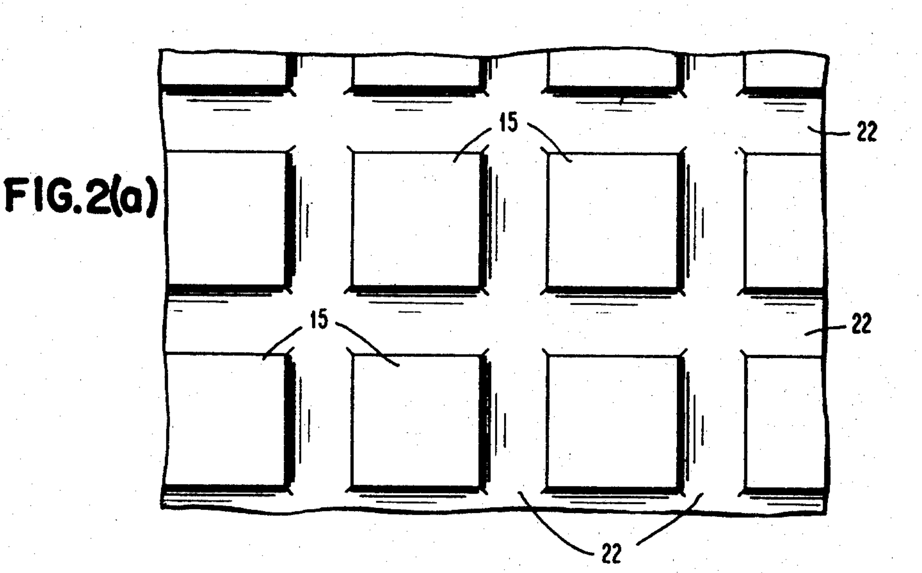
Figure 2B:
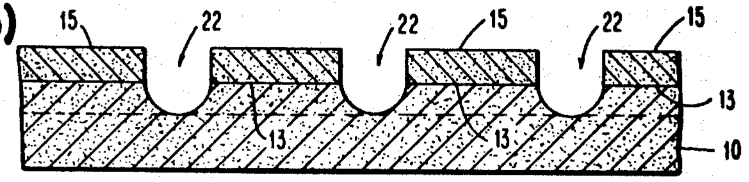
Figure 2C:
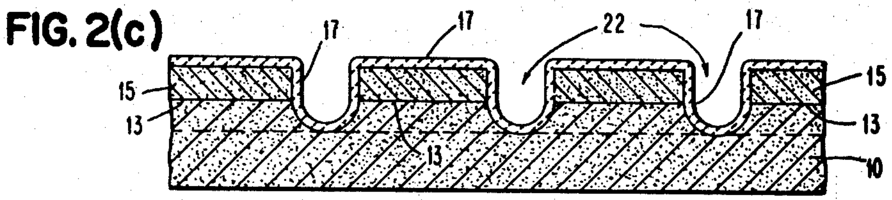
Figure 2D:
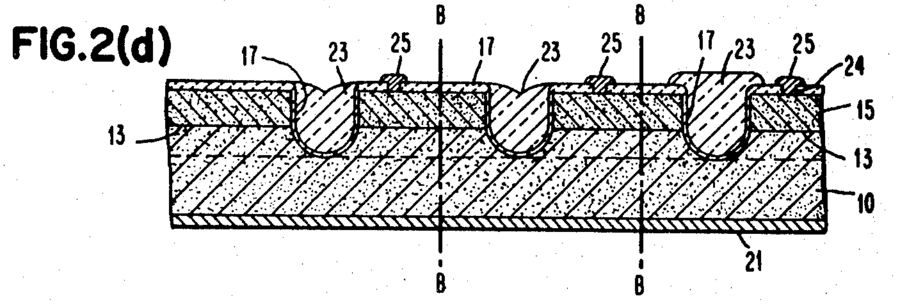

The foregoing and other objects, features and advantages of the invention will be apparent from the following more particular description of preferred embodiments of the invention, as illustrated in the accompanying drawings:

In the drawings:

FIGS. 1(*a*)–1(*e*) are sectional views representing a portion of an array of semiconductor devices during various steps in the manufacture thereof;

FIGS. 2(*a*)–2(*d*) are plan and sectional views representing a portion of a different array of semiconductor devices during various manufacturing steps;

FIGS. 3(*a*) and 3(*b*) are plan and sectional views of a portion of an integrated circuit structure which includes both passive and active circuit elements;

Description of FIGS. 1(*a*)–1(*e*) semiconductor devices

Referring now more particularly to FIG. 1(*a*) of the drawings, there is represented a fragmentary portion of a large array of semiconductor devices such as diodes. An arrangement of this sort would result from the microminiaturized fabrication of those devices and could, for example, comprise several hundred semiconductor diodes formed on a semiconductor body or substrate 10 of a material such as silicon having dimensions of about 0.75" x 0.75" x 5 mils. The body 10 has a film of metal oxide 11 formed thereon integral with the upper surface thereof. While various surface oxide films may be employed, this film is preferably a genetic layer formed from the parent silicon body 10 by means other than simply exposing that silicon body to the atmosphere. This film may be derived from the parent body by various means which are well known in the art such as by electrochemical treatment or by heating the body to between 900° C. to 1400° C. in an oxidizing atmosphere of air saturated with water vapor or in an atmosphere of steam. Patent 2,802,760 of Derick et al. granted Aug. 13, 1957, and entitled, "Oxidization of Semiconductor Surfaces for Controlling Diffusion," describes one such treatment. Although the exact chemical composition of the oxide film 11 is not known, it is believed that silicon dioxide is the major component of that film. However, it will be referred to in the claims as a silicon oxide film. Other metal oxide films such as aluminum oxide have also been employed with success in some applications.

Apertures 12, 12 are formed at predetermined locations in the film 11 by conventional photoengraving techniques. In a manner well known in the art, a photoengraving resist (not shown) is placed over the silicon dioxide film 11 and the resist is then exposed through a master photographic plate having opaque areas corresponding to the regions from which the oxide film is to be removed. In the photographic development, the unexposed resist is removed and a corrosive fluid is employed to remove the oxide film from the now exposed regions while the developed resist serves as a mask to prevent the chemical etching of the oxide areas that are to remain on the silicon body 10.

In the next operation, a plurality of PN junctions 13, 13 (see FIG. 1(*d*) are created in the body 10, which junctions extend to the upper surface 14 of that body. This is accomplished by a conventional diffusion operation wherein a suitable conductivity-determining impurity passes through the apertures 12, 12 and diffuses into the body 10 to establish therein regions 15, 15 of a conductivity type opposite to that of the body and to create the junctions 13, 13. The elevated temperature of the diffusion operation does not damage the silicon dioxide film 11, which has a thickness in the range of 1,000–30,000 angstroms, is impervious to the diffusing material and hence serves as a passivating and diffusion mask that confines the diffusion to predetermined areas on the surface 14 of the body 10. It will be observed that in the diffusion operation the impurity creeps or diffuses for a short distance under the edge portions of the silicon dioxide film 11 which define the apertures 12, 12. Silicon dioxide films having thickness in the range of 5,000–6,000 angstroms have proved to be very effective for their overall purpose in the present invention. Extensive work has been performed and excellent results obtained when the silicon dioxide films have a thickness of 5,000 angstroms, the thickness of the film being determined by the length of time that the silicon body 10 has been exposed at an elevated temperature to the highly oxidizing atmosphere employed in the formation of that film prior to the photoengraving and diffusion operations.

For some applications, particularly where the depth of diffusion in the establishment of the regions 15, 15 is not great, it may be desirable to reoxidize the upper surface of the FIG. 1(*b*) structure, thereby creating the thin silicon doxide film 17 over the upper surface of the structure represented in FIG. 1(*c*). The buildup of the film 17 on the existing silicon dioxide film 17 is inherently slower than that portion 18 of the film appearing on the exposed surface of the semiconductor region 15, and this is shown in the FIG. 1(*c*) representation. It will be understood, however, that except for the film portion 18, the remainder of the film 17 on the film 11 is actually integral with the latter and that no line of demarcation exists therebetween, although such a line has been shown in the drawing simply as an aid in the explanation and in the understanding of this operation. A steam oxidization treatment is effective in establishing the film 17. In connection with the two oxidization operations mentioned above with respect to the upper surface of the structure, silicon dioxide films are also created on the bottom surface of that structure. For the purpose of simplifying the representation, however, those films have been omitted since they are readily removed by a conventional lapping operation.

In the next fabricating step, a thin glass film or coating 19 (see FIG. 1(*d*)) is chemically bonded to the silicon dioxide film system 11, 17, 18. This may be accomplished by any of several well-known techniques such as spraying, settling, or silk screening, followed by a firing process to form a glass film having a thickness in the range of 8,000–500,000 angstroms that is bonded to the silicon dioxide film system. Glass films 19 having thicknesses in the range of 20,000–50,000 angstroms have proved to be particularly effective, and films having a thickness of about 30,000 angstroms have proved to be very practical for silicon diodes and transistors. A method of forming a glass film 19 which has been found to be convenient, practical and extremely satisfactory is that disclosed in the copending application of William A. Pliskin and Ernest E. Conrad, filed September 1961, entitled "Method of Forming a Glass Film on an Object and the Product Produced Thereby," and assigned to the same assignee as the present invention. Briefly that method comprises centrifuging the structure of FIG. 1(*c*) in an organic fluid having a dielectric constant in the range of 3.4 to 20.7 and containing a suspension of finely divided glass particles to deposit a coating of such particles thereon, removing the structure from that fluid, and then heating the structure above the softening temperature of the glass particles for a time sufficient to fuse the particles to the silicon dioxide film system 11, 17, 18, thereby producing a thin uniform hole-free adherent glass film over the upper surface of the structure. Suspending media for the glass particles may include organic fluids such as benzine, hexane, petroleum ether, methyl acetate, ethyl acetate, tertiary butyl alcohol mixed with a small amount of secondary butyl alcohol to maintain the former fluid at room temperature, isopropyl alcohol, acetone, methyl alcohol, ethyl alcohol, dimethyl formamide and various mixtures of those fluids. Excellent results with this centrifuging and fusing technique are obtained when the selected suspending medium for the glass particles has a dielectric constant within the range of 6–12 and the mean particle size of the comminuted glass is about 0.1–0.7 micron. A mixture of ten parts of isopropyl alcohol and 90 parts of ethyl acetate has proved to be a very desirable suspending fluid. A centrifuging speed sufficient to develop a centrifugal force of from 1,000–2,500 times the force of gravity in conjunction with a 1–2 minute centrifuging operation has proved to be useful in depositing glass having a particle size in the range under consideration. The fusing operation may be conducted for about one to two minutes at a softening temperature in the range of 440–950° C., the temperature depending upon the type of glass selected to serve as the comminuted glass in the suspending fluid. The duration of the fusing operation in the temperature range just mentioned is such that the devices under consideration are capable of withstanding the fusing temperature.

In order that the resultant semiconductor device or devices may operate satisfactorily over a wide range of temperatures without the creation of undesirable cracks in the glass which might impair the effectiveness of the hermetic glass seal, it is ordinarily desirable to select a glass having a thermal coefficient of expansion that substantially matches that of the silicon body 10. Chemical resistant glasses such as a borosilicate-type glass have proved to be particularly attractive. Since silicon has a coefficient of linear expansion per degree centigrade of $32 \times 10^{-7}$, a borosilicate glass available to the trade as Corning 7740 or Pyrex and having a coefficient of expansion of $32.6 \times 10^{-7}$ is extremely desirable. However, it will be understood that various other types of glasses with thermal coefficients considerably different from that of the semiconductor body 10 may be employed in this centrifuging glassing technique, depending to some extent upon the thickness of the glass film which is laid down and the temperature range which the device may encounter during operation. It will be clear that undesirable strains in the glass may be reduced by choosing a rather close match of the thermal coefficients of the glass and the semiconductor body. In general, when thinner glass films are employed as protective jackets in the environment under consideration, it is possible to have a greater mismatch in expansion coefficients between the substrate and the glass than can be tolerated wtih thicker glass films, without subjecting those films to harmful cracking. For example, Pemco 1117 glass has an expansion coefficient of $64 \times 10^{-7}$ per degree centigrade whereas a silicon substrate has, as previously mentioned, an expansion coefficient of only $32 \times 10^{-7}$ per degree centigrade. Using the centrifuging and fusing technique of the above-identified copending application of Pliskin and Conrad, films of the glass just identified having thicknesses as great as 90,000 angstroms did not crack upon application to the structure of FIG. 1(*c*) nor did they crack upon cycling between a temperature of 300° C. and immersion in liquid nitrogen at a temperature of −196° C.

The following tabulation lists some of the several types of glasses which have been successfully bonded to conditioned silicon substrates of the type under consideration by the centrifuging and fusing procedures mentioned above.

solution of various silicates with some excess silicon dioxide. Borosilicate glasses have part of that silicon dioxide replaced by boron oxide. When the borosilicate glass film 19 of FIG. 1(*d*) is fused to the silicon dioxide film system 11, 17, 18, which is compatible with the former, the undersurface of the glass film reacts chemically with the upper surface of the film system 11, 17, 18 and forms a glass region having a reduced boron oxide content. An endeavor has been made to convey this change by diagrammatically representing in FIG. 1(*d*) that the oxide film 17, 18 is somewhat thinner than the corresponding film illustrated in FIG. 1(*c*). It will be recalled, however, that the silicon dioxide film system 11, 17, 18 is really one film of silicon dioxide. The under portion of the silicon dioxide system does not react chemically with the glass film, which during this fusing operation is at a temperature of from about 15 to 65 degrees above the softening temperature of the glass, depending upon the type of borosilicate glass which is being employed. Accordingly, the silicon dioxide film system, because the buffering action of its inner portion thereof, serves as a barrier layer or protective element which prevents the harmful impurities such as the P-type impurity boron in the glass from penetrating the silicon regions 10 and 13, interacting therewith, and impairing the precisely established electrical characteristics thereof. It should also be mentioned that the fusing period is sufficiently low and that the application temperatures of the borosilicate glass film 19, which temperatures may be in the range from about 625 to 845° C., are also sufficiently low with reference to a temperature which would adversely affect the device, that the fusing period and temperature are compatible with the technology employed in making the silicon semiconductor devices. When the glass film cools to room temperature, it is integrally united or bonded with the silicon dioxide film system

| Glass | Softening Point, ° C. | Approximate Minimum Application, Temp. ° C. | Coef. of Exp. per ° C. | Constituents |
|---|---|---|---|---|
| Corning Glasses: | | | | |
| 1826 Aluminosilicate | | 650 | $49 \times 10^{-7}$ | Major: $SiO_2$, $B_2O_3$; Minor: $Al_2O_3$, PbO. |
| 3320 Hard Sealing Uranium Glass | 780 | 810 | $40 \times 10^{-7}$ | |
| 7050 Borosilicate-Series Sealing | 703 | 760 | $46 \times 10^{-7}$ | Major: $SiO_2$, $B_2O_3$. |
| 7052 Borosilicate-Kovar Sealing | 708 | 775 | $46 \times 10^{-7}$ | Major: $SiO_2$, $B_2O_3$. |
| 7070 Borosilicate-Low Loss Electrical | 700 | 780 | $32 \times 10^{-7}$ | Major: $SiO_2$, $B_2O_3$. |
| 7570 Soldering Glass | 440 | 475 | $84 \times 10^{-7}$ | Major: PbO, $SiO_2$, $B_2O_3$. |
| 7720 Borosilicate (Tungsten Sealing-Nonex) | 755 | 805 | $37 \times 10^{-7}$ | Major: $SiO_2$, $B_2O_3$. |
| 7740 Borosilicate (Pyrex) | 820 | 845 | $32.6 \times 10^{-7}$ | Major: $SiO_2$, $B_2O_3$. |
| 9741 Borosilicate | 705 | 785 | $39 \times 10^{-7}$ | Major: $SiO_2$, $B_2O_3$. |
| 8870 High Lead Sealing | 580 | 590 | $91 \times 10^{-7}$ | Major: $SiO_2$, PbO; Minor: $_2$KO. |
| 8871 Capacitor | 527 | 550 | $103 \times 10^{-7}$ | |
| 2405 Hard Red | 770 | 810 | $43 \times 10^{-7}$ | |
| Pemco Corp.: | | | | |
| S1117 | 600 | 625 | $64 \times 10^{-7}$ | Major: $B_2O_3$, $SiO_2$, ZnO, PbO. |
| PIM 38 | | 820 | ---------- | Major: $SiO_2$, $B_2O_3$, 10% ZnO. |

At this time it appears desirable to consider further the role of the silicon dioxide film system 11, 17, 18, the glass film 19, and their interrelationships. Because of its chemical inertness in the operating temperature range of a silicon semiconductor device, and also because of its physical stability and mechanical compatibility with silicon, a borosilicate glass should be extremely desirable for use in the glassing of such a device. However, a borosilicate glass contains various harmful impurities such as the P-type doping agent boron which prevents that glass from being applied or fused directly to a semiconductor device containing PN junctions without injuring those junctions or impairing the electrical characteristics of the semiconductor material and the devices therein. In accordance with the present invention, an inert metal oxide layer such as silicon dioxide is employed between the semiconductor surface and the glass protective layer so as to avoid interaction between the glass and the semiconductor and deterioration of the device properties. Since the silicon dioxide layer system 11, 17, 18 represented in FIG. 1(*c*)is genetically derived from the parent body, it is intimately bonded thereto and is effectively an integral part thereof. Glass consists of a mixture or solid which in turn is integrally united with the silicon body. Thus there effectively exists over the silicon body, with its PN junctions coming to the surface of that body, a very thin protective film which is chemically bonded to and integrally united with the surface of the body, is hole-free and impervious to external agents which might impair the electrical characteristics of the semiconductor devices in that body, and affords the desirable thermal and mechanical properties of a good protective film.

Before the semiconductor devices or diodes under consideration may be connected in circuit, it is necessary that they be supplied with suitable terminals. This is accomplished by etching holes through the glass and silicon dioxide films so as to expose portions of the surfaces of the semiconductor regions 15, 15, and then applying ohmic contacts thereto and to the lower surface of the semiconductor base 10. FIG. 1(*e*) represents the resulting structure after these operations have been performed. A suitable acid such as hydrofluoric acid is employed to perform the etching operation, which is accomplished through openings in a conventional etching mask that is placed on the glass film 19 and is properly oriented with respect to the semiconductor regions 15, 15. The size of the apertures in the mask, together with the etching time and the concentration of the etching solution, are selected so that the silicon dioxide films 11 and 17 and some glass span the portion of the junction 13 which extends to the surface of the semiconductor body, is represented in FIG. 1(*e*). In that way the junction is provided with a coating of an inert protective material. Thereafter, a thin film 20 of a conductive metal is suitably deposited as by evaporation on the exposed surfaces of the semiconductor regions 15, 15 and on selected portions of the glass film 19 in the manner shown in FIG. 1(*e*). A conductive layer 21 is attached to the bottom surface of the semiconductor body 10 as by soldering or by evaporation. Since the structure under consideration is but a portion of a large array of semiconductor devices on a single substrate or body 10, it may be desirable for some applications to sever the body in a conventional manner as by ultrasonic cutting of fracturing at prescribed regions such as along the broken line A—A to form a multiplicity of individual devices.

Planar diffused PN and NP silicon diodes made in the manner explained above and having a silicon dioxide film thickness of 5,000 angstroms, a borosilicate glass film 30,000 angstroms thick which was fired for 10 minutes at a temperature of 845° C., and an active junction diameter of 20 mils have afforded a 95% yield, a breakdown voltage of 40, and a 5 nanoampere leakage at 5 volts. In this instance the yield is defined as the percentage of the units which, after the glassing operation, showed no adverse effects on the DC electrical properties of those units within the limits of measurement. Silicon diodes have also been made with active areas that are 5 mils in diameter, having a breakdown voltage of 55, and a 0.22 nanoampere leakage current at 10 volts. These diodes were glassed in accordance with the techniques of the present invention without changing those electrical characteristics. High yields were afforded. Life tests of acceptable units showed no failure after five months of operation. Twenty-four hour exposure tests at temperatures up to 450° C. in steam at atmospheric pressure and exposures to chlorine at 650° C. to check for porosity and pinholes demonstrated that planar diodes constructed in accordance with the present invention were most satisfactory. On the other hand, half the silicon planar diodes having oxide surfaces but lacking the glass film thereover failed before reaching the 450° C. exposure in steam at atmospheric pressure. Indications are that the protection afforded by the glassing technique of the present invention is comparable and possibly better than that afforded by the hermetic sealing of semiconductor devices in metal cans. Furthermore, the use of artificial ambients such as helium or drying agents that are employed in conventional sealed containers for semiconductor devices is completely avoided, thus effecting a significant saving in manufacturing costs.

Description of FIGS. 2(*a*)–2(*d*) semiconductor devices

Referring now to FIG. 2(*a*)–2(*d*), there are represented the plan and sectional views of a portion of a mesa array of silicon PN junctions which is generally similar to that shown in FIGS. 1(*a*)–1(*e*). Accordingly, corresponding elements are designated in the two series of figures by the same reference numerals. The semiconductor body 10 of one conductivity type has diffused into its upper surface a suitable impurity to create a continuous region 15 of the opposite conductivity type. A plurality of mutually perpendicular moats 22, 22 are etched in a conventional manner through the region 15 of opposite conductivity type and part way into the semiconductor body 10 to create a plurality of discrete PN junctions 13, 13 and regions 15, 15 of the opposite conductivity type to that of the semiconductor body. To protect exposed junctions which extend to a surface of that array, a thermally oxidized film 17 is established in the manner previously indicated on the upper surface of the regions 15, 15 and in the moats as represented in FIG. 2(*c*). Again the thickness of the film 17 may be about 1,000–30,000 angstroms. Thereafter a powdered glass such as a borosilicate glass preferably having a thermal coefficient of expansion which closely matches that of the silicon body 10 is placed on the silicon dioxide film 17 in the moats 22, 22. When the assembly is heated slightly above the softening temperature of the powdered glass, the latter fuses to the silicon dioxide film in the moat, reduces the thickness thereof somewhat, and chemically bonds thereto in the manner described above in connection with FIG. 1(*d*). Upon cooling, the resultant structure resembles that shown in FIG. 2(*d*) wherein glass barriers 23, 23 and the silicon dioxide films 17 thereunder completely seal the PN junctions 13, 13 where they extend into the moats 22, 22. It is the sealing of these formerly exposed portions of the PN junctions 13, 13 which is extremely important in the production of reliable semiconductor devices.

To provide the electrical connections to the regions 15, 15, suitable apertures 24, 24 are selectively etched in a conventional manner in the silicon dioxide film in prescribed areas, and then metal films or buttons 25, 25 are deposited as by evaporation in those apertures to provide terminals. A terminal 21 is also applied to the lower surface of the body 10. Thereafter, if required, the array is severed along the broken lines B—B to form a multiplicity of individual mesa-type semiconductor diodes. It will be manifested that the structure of FIG. 2(*d*), by protecting very adequately the ambient-sensitive regions of the diodes, affords the many benefits of the embodiment of the invention previously described.

Figure 3:
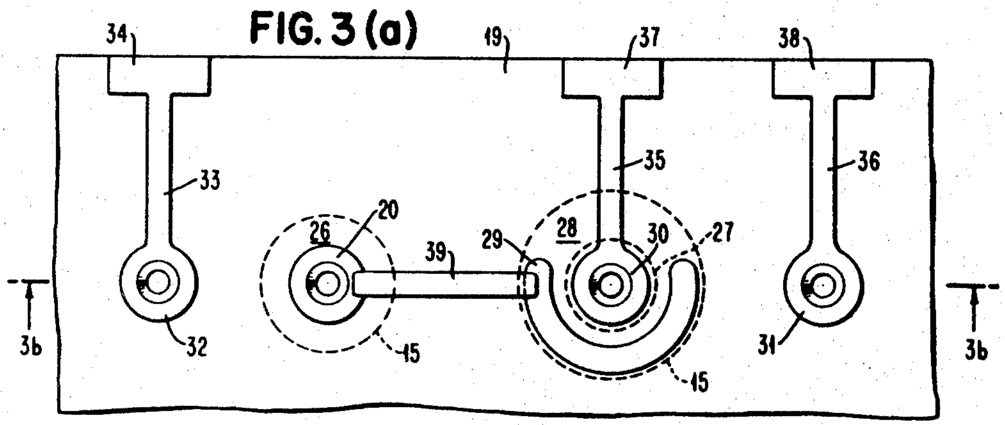
Figure 3:
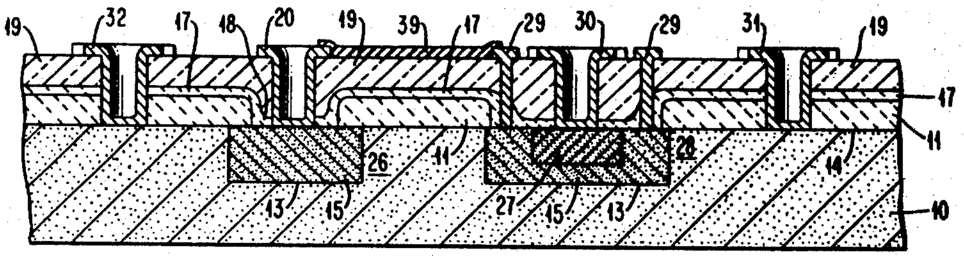

Description of arrangement of FIGS. 3(*a*)–3(*b*)

An important application of the glassing technique of the present invention is in connection with microminiaturization. In addition to the production on a single silicon substrate of active circuit elements such as transistors and diodes, it is often desirable to combine them in an operative circuit relation with passive circuit elements such as printed or deposited resistors and circuit connections. The protective glass films of the present invention readily lend themselves to the formation of such an integrated package in addition to providing the necessary protection for the active circuit elements.

Figure 4:
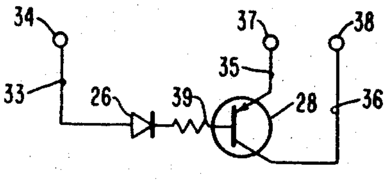
FIG. 4 is a circuit diagram of the circuit structure of FIGS. 3(*a*) and 3(*b*)

Referring now to FIG. 3(*a*), there is represented a plan view of a fragmentary portion of a large integrated circuit package, while FIG. 3(*b*) is a sectional view taken on the line 3*b*—3*b* of FIG. 3(*a*). Since various portions of FIG. 3(*b*) are generally similar to corresponding portions of FIG. 1(*e*), corresponding elements in the former are designated by the same reference numerals appearing in the latter. A single silicon substrate or body 10 supports the remaining elements. The left-hand region 15, together with the body 10 adjacent thereto, constitute a diode 26, which is represented schematically in FIG. 4, while the right-hand region 15, the region 10 adjacent thereto, and the diffused semiconductor region 27 within the region 15, which is of a conductivity type opposite to that of region 15, constitute a transistor 28, which is also represented schematically in FIG. 4. A U-shaped terminal 29 such as that represented in FIG. 3(*a*) is provided for the base region 15 of transistor 28 in the manner previously explained in connection with FIG. 1(*e*) while a terminal 30 is similarly provided for the emitter region 27 of that transistor. A terminal 31 for the collector region comprising the body 10 of the transistor 28 is established by etching through the glass and oxidized layers 19, 17, 11 and then evaporating a conductive metal on the exposed upper surface of the body 10 and on the walls of the opening. The diode 26 has a terminal 32 which is similarly constructed.

A conductive connection 33 of negligible resistance, which is bonded to the glass film as represented in FIG. 3(*a*) as by evaporation or sputtering, serves to connect the terminal 32 with an enlargement or land 34 that facilitates connecting the diode 26 to an external circuit. Similarly connections 35 and 36 interconnect terminals 30 and 31 of the transistor 28 with individual lands 37 and 38. Since the terminal 20 of the diode 26 is to be connected to the base terminal of the transistor 28 through a resistor 39, as indicated schematically in FIG. 4, the resistor (as represented in FIGS. 3(*a*) and (*b*)) constitutes a thin film of a suitable resistance material such as chromium or tin oxide which is deposited on the glass film 19 in a conventional manner so that it interconnects those terminals. Thus there is formed an integrated circuit package wherein the passive elements such as the resistor and the circuit interconnections are intimately attached to the surface of the glass film 19, which also serves to seal the vertically extending regions of the junctions in the manner previously explained. It will be understood, of course, that the integrated circuit package which has been represented is but a fragmentary representation of what may constitute a very complex package of miniature dimensions. It will also be apparent that capacitive circuit elements may be formed on the glass film if desired, by a metal depositing operation.

Figure 5:
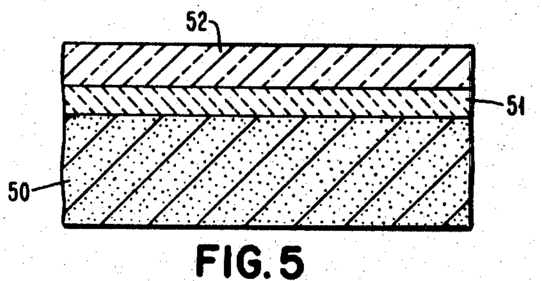
FIG. 5 is a sectional view of a metallic object with a glass coating in accordance with the present invention.

Description of coated object of FIG. 5

As previously indicated, the techniques of the present invention are not limited to use in connection with silicon substrates. For some applications it may be desirable to provide an impervious protective glass coating to a base member such as a metal object. To that end, there is represented in FIG. 5 a metallic base member 50 which is to receive a thin impervious protective jacket on its upper surface. This may be accomplished conveniently by first depositing, as by evaporation on the member 50, a thin film 51 of either silicon monoxide or silicon dioxide having a suitable thickness such as in the range of 1,000 to 30,000 angstroms. A suitable material, which is believed to be of the mixed oxide form is sold as silicon monoxide by the Kemet Company, a division of Union Carbide and Carbon Corp., of 30 East 42nd St., New York, N.Y., and also by Vacuum Equipment, a division of the New York Airbrake Co., of 1325 Admiral Wilson Blvd., Camden, N.J. Such a film will be tightly adherent to the base member 50. Thereafter the centrifuging and fusing glassing technique of the above-identified copending application of Pliskin and Conrad may be employed to apply and bond to the film 51 a glass coating 52 having a thickness in the range of 8,000 to 500,000 angstroms. However, other known glassing techniques may be employed to bond the coating 52 to the oxide film 51. The metal base member must be one which is capable of withstanding a temperature at least as great as the softening temperature of the glass film 51 during application.

Figure 6:
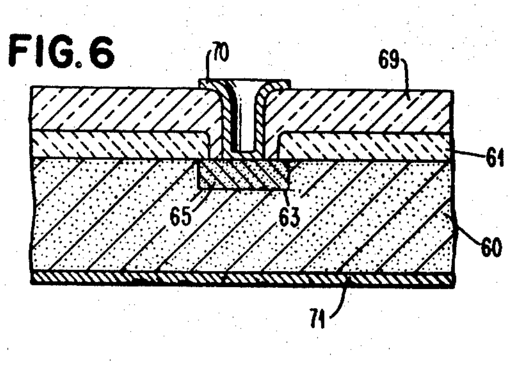
FIG. 6 is a sectional view of a germanium silicon diode with a protective glass coating thereon in accordance with another aspect of the present invention.

Description of semiconductor device of FIG. 6

A thin glass film of the type under consideration may also be successfully bondod to other semiconductor materials to protect their PN junctions. Since an adherent glass coating cannot be readily bonded to a germanium oxide or dioxide layer established on the surface of a germanium semiconductor body 60, such as that represented for the diode in FIG. 6, it is expedient to deposit as by evaporation a thin film 61 of silicon dioxide or silicon monoxide over the upper surface of the body and over the PN junction 63. It will be seen that the junction extends to the surface of the body 60 and lies between that body and the region 65 of the opposite conductivity type. Thereafter a layer 69 of a suitable glass is deposited on the film 61 in a manner explained above. Since germanium has a melting point of about 938° C., which is about 478° C. below the melting point of silicon, it may be desirable to employ as the coating 69 a glass having a lower softening temperature than some borosilicate glasses in order not to damage the electrical properties of the semiconductor diode. To that end, one may employ a borosilicate glass such as Pemco S1117 glass, which has a softening point of 600° C. or Corning 1826 Aluminosilicate, the application temperature of the latter being about 650° C. After a suitable aperture is etched in the films 61 and 69 to expose a portion of the upper surface of region 65, a terminal 70 may be applied thereto in a conventional manner along with another terminal 71 on the lower surface of the member 60.

From the foregoing descriptions and explanations, it will be seen that the coating technique of the present invention and the coating produced thereby are effective to protect electrical devices such as semiconductor devices from ambient effects so as to retain their desired electrical characteristics and reliability, decrease their cost, and render them amenable to incorporation into miniaturized and integrated circuits. The thin impervious glass films or coatings of the present invention are chemically bonded to the semiconductor devices they protect and become an integral part of those devices. Furthermore, such a glass film, because of the silicon oxide buffer layer which is bonded thereto and in turn bonded to a surface portion of the semiconductor device, affords a double protective seal at the most sensitive region of the device, namely at the region where the PN junction intersects the surface of that device. The silicon oxide portion of the protective jacket, in addition to forming a passivating mask in the region of the junction and over at least a portion of the surface of the semiconductor device, protects the junction and that surface from contaminants including those which might be in the glass film fused to the oxide portion of that jacket. Accordingly, the silicon oxide buffer films permit the use of high temperature chemically resistant glasses thereover which otherwise could not be used because of elements in those glasses which would impair the characteristics of the semiconductor devices if those glasses were applied directly to the surfaces of those devices. Since such glasses have thermal coefficients of expansion which may closely match that of a semiconductor body such as silicon, a suitable glass may be selected for bonding to the semiconductor body to minimize the development of stresses and consequent glass cracking during operative temperature cycling. The protection afforded to the PN junctions in semiconductor devices by the use of the techniques of the present invention is considered comparable to that achieved by the hermetically sealing of such devices in metal containers. A saving in manufacturing costs results because of the elimination of such containers and their metal-to-glass seals. The present invention also lends itself to the use of batch techniques wherein hundreds of semiconductor devices are made simultaneously, and this further helps to reduce manufacturing costs.

While the invention has been particularly shown and described with reference to preferred embodiments, it will be understood by those skilled in the art that the foregoing and other changes in the form and details may be made therein without departing from the spirit and scope of the invention.

What is claimed is:

1. A coated object comprising: a base member; a film of a metal oxide having a thickness in the range of 1,000–30,000 angstroms adherent to a surface of said member; and a glass coating chemically bonded to said film and having a thickness in the range of 8,000–500,000 angstroms; said base member being capable of withstanding during the bonding operation a temperature at least as great as the softening temperature of said coating.

2. A coated object comprising: a base member; a film of silicon oxide having a thickness in the range of 1,000–30,000 angstroms adherent to a surface of said member; and a glass coating chemically bonded to said film and having a thickness in the range of 8,000–500,000 angstroms; said base member being capable of withstanding during the bonding operation a temperature at least as great as the softening temperature of said coating.

3. A coated object comprising: a base member; a film of silicon oxide having a thickness in the range of 2,000–10,000 angstroms adherent to a surface of said member; and a glass coating chemically bonded to said film and having a thickness in the range of 20,000–50,000 angstroms; said base member being capable of withstanding during the bonding operation a temperature at least as great as the softening temperature of said coating.

4. A coated object comprising: a silicon base member; a film of silicon oxide having a thickness in the range of 5,000–6,000 angstroms adherent to a surface of said member; and a glass coating chemically bonded to said film and having a thickness in the range of 20,000–50,000 angstroms; said base member being capable of withstanding during the bonding operation a temperature at least as great as the softening temperature of said coating.

5. A coated object comprising: a base member; a film of silicon oxide having a thickness of about 5,000 angstroms adherent to a surface of said member; and a glass coating chemically bonded to said film and having a thickness of about 30,000 angstroms; said base member being capable of withstanding during the bonding operation a temperature at least as great as the softening temperature of said coating.

6. A coated object comprising: a metallic base member; a film of silicon oxide having a thickness in the range of 1,000–30,000 angstroms adherent to a surface of said member; and a glass coating chemically bonded to said film and having a thickness in the range of 8,000–500,000 angstroms; said base member being capable of withstanding during the bonding operation a temperature at least as great as the softening temperature of said coating.

7. A coated object comprising: a base member; a film of a metal oxide having a thickness in the range of 1,000–30,000 angstroms adherent to a surface of said member; a glass coating bonded to said film and having a thickness in the range of 8,000–500,000 angstroms; said base member being capable of withstanding during the bonding operation a temperature at least as great as the softening temperature of said coating; and individual electrical connections extending through said film and said coating to engage portions of the surface of said member.

8. A coated object comprising: a base member; a film of silicon oxide having a thickness in the range of 1,000–30,000 angstroms adherent to a surface of said member; a glass coating bonded to said film and having a thickness in the range 8,000–500,00 angstroms; said base member being capable of withstanding during the bonding operation a temperature at least as great as the softening temperature of said coating; and individual electrical connections extending through said film and said coating to engage portions of the surface of said member.

9. A coated object comprising: a base member; a genetic film of silicon oxide having a thickness in the range of 1,000–30,000 angstroms adherent to a surface of said member; a glass coating bonded to said film and having a thickness in the range of 8,000–500,000 angstroms; said base member being capable of withstanding during the bonding operation a temperature at least as great as the softening temperature of said coating; and individual electrical connections extending through said film and said coating to engage portions of the surface of said member.

References Cited

UNITED STATES PATENTS

| | | | |
|---|---|---|---|
| 3,301,706 | 1/1967 | Flaschen et al. | 117—215 X |
| 3,303,399 | 2/1967 | Hoogendoorn et al. | 117—215 |
| 3,331,994 | 7/1967 | Kite | 117—200 |

WILLIAM L. JARVIS, *Primary Examiner.*

U.S. Cl. X.R.

117—215, 118